US012570447B2

(12) United States Patent
Muchnikov et al.

(10) Patent No.: US 12,570,447 B2
(45) Date of Patent: Mar. 10, 2026

(54) SYSTEMS, DEVICES, AND METHODS FOR TRANSPORT AND STORAGE OF AIR-SENSITIVE MATERIALS

(71) Applicant: TAE Technologies, INC., Foothill Ranch, CA (US)

(72) Inventors: Anatoly Muchnikov, Mission Viejo, CA (US); Sergey Vdovichev, Foothill Ranch, CA (US); Frank Jauregui, Fountain Valley, CA (US)

(73) Assignee: TAE Technologies, Inc., Foothill Ranch, CA (US)

( * ) Notice: Subject to any disclaimer, the term of this patent is extended or adjusted under 35 U.S.C. 154(b) by 174 days.

(21) Appl. No.: 18/472,089

(22) Filed: Sep. 21, 2023

(65) Prior Publication Data

US 2024/0092545 A1 Mar. 21, 2024

Related U.S. Application Data

(60) Provisional application No. 63/408,636, filed on Sep. 21, 2022.

(51) Int. Cl.
*B65D 25/54* (2006.01)
*B65D 53/02* (2006.01)
(Continued)

(52) U.S. Cl.
CPC ............. *B65D 53/02* (2013.01); *B65D 25/54* (2013.01); *B65D 81/2038* (2013.01);
(Continued)

(58) Field of Classification Search
CPC ...... G21K 5/08; H05H 2006/002; H05H 6/00; B65D 85/38; B65D 85/68; B65D 85/48;
(Continued)

(56) References Cited

U.S. PATENT DOCUMENTS 2,757,957 A * 8/1956 Samann ................. B65D 75/12 206/0.5
3,105,916 A * 10/1963 Marker ..................... H01J 5/18 313/35
(Continued)

FOREIGN PATENT DOCUMENTS

CN 107697476 B * 6/2019 ............. B65D 81/07
DE 29821109 U1 * 4/2000 ............. B65D 45/18
(Continued)

OTHER PUBLICATIONS

Marks, "Accelerator Magnets," Room Temperature Magnets, CAS Praque 2014, (Jul. 2014).
(Continued)

*Primary Examiner* — Mollie Impink
(74) *Attorney, Agent, or Firm* — ALSTON & BIRD LLP

(57) ABSTRACT

Provided are methods and systems for volatile object transport. An example volatile object transport container includes a viewport assembly, a target container housing configured to accommodate clamp assemblies affixable to a volatile object, and a sealing member positioned between the viewport assembly and the target container housing. The sealing member is configured to provide an air-tight seal within an interior cavity of the volatile object transport container when the viewport assembly and target container housing are affixed to one another.

16 Claims, 13 Drawing Sheets

(51) Int. Cl.

| | |
|---|---|
| ***B65D 81/20*** | (2006.01) |
| ***B65D 85/00*** | (2006.01) |
| ***G21K 5/08*** | (2006.01) |
| ***H05H 3/06*** | (2006.01) |
| ***H05H 6/00*** | (2006.01) |

(52) U.S. Cl.
CPC ............... *B65D 85/70* (2013.01); *H05H 3/06* (2013.01); *H05H 6/00* (2013.01); *G21K 5/08* (2013.01)

(58) Field of Classification Search
CPC ................ B65D 85/84; B65D 81/2038; B65D 81/2015; B65D 81/05; B65D 81/18; B65D 81/38; B65D 81/40
USPC .................................................. 206/449–456
See application file for complete search history.

(56) References Cited

U.S. PATENT DOCUMENTS

| | | | | |
|---|---|---|---|---|
| 4,562,037 | A * | 12/1985 | Panayotou | H05H 6/00 376/202 |
| 9,991,013 | B2 * | 6/2018 | Parnaste | H05H 6/00 |
| 11,145,430 | B2 * | 10/2021 | Campanella | H05H 6/00 |
| 2006/0011866 | A1 | 1/2006 | Cho | |
| 2013/0075596 | A1 * | 3/2013 | Matsuno | G02B 26/001 250/226 |
| 2023/0070813 | A1 * | 3/2023 | Guerin | H05H 6/00 |
| 2023/0176472 | A1 * | 6/2023 | Chen | G03F 7/70916 430/5 |

FOREIGN PATENT DOCUMENTS

| | | | |
|---|---|---|---|
| JP | S61-085100 | U | 6/1986 |
| JP | 2009-32623 | A | 2/2009 |
| JP | 2010-509714 | A | 3/2010 |
| JP | 2015-217207 | A | 12/2015 |

OTHER PUBLICATIONS

Taskaev, S., et al., "Vacuum-Insulation Tandem Accelerator for Boron Neutron Capture Therapy," Proceedings of IPAC2011, Spain, CERN, Sep. 2011, pp. 3615-3617.

* cited by examiner

SYSTEMS, DEVICES, AND METHODS FOR TRANSPORT AND STORAGE OF AIR-SENSITIVE MATERIALS

The present application claims priority to U.S. Provisional Application Ser. No. 63/408,636, titled "SYSTEMS, DEVICES, AND METHODS FOR TRANSPORT AND STORAGE OF AIR-SENSITIVE MATERIALS," filed Sep. 21, 2022, the contents of which are incorporated herein by reference in their entirety for all purposes.

FIELD

The subject matter described herein relates generally to systems, devices, and methods for storage and transport of objects or materials that are sensitive to atmospheric conditions.

BACKGROUND

In order to make a neutron-producing target, a lithium layer is affixed to a metal (e.g., copper) base plate (e.g., or substrate). Lithium can be affixed to the substrate by means of physical evaporation, by mechanical attachment, or other means. Lithium is known to form a thin surface contamination layer made of lithium nitride and/or oxide and/or hydroxide on its surface when exposed to air. This layer can interfere with adhesion to a metal substrate. Moreover, the layer is a lithium compound, resulting in a decreased neutron yield (if the pure lithium turns to a compound).

Existing solutions for transporting these substances, including transporting lithium material under oil, significantly complicate the process, because a complex surface cleaning step is necessitated prior to use of the target.

Other existing systems, require metallized mylar bags, which are known for their low permeability rate for air and moisture. However, one cannot observe the state of the lithium material inside. Observing the lithium material inside of the container is important for discovery of contamination of the lithium with air (without damaging the package), as well as observing the goods inside of the package from the standpoint of international shipping.

To ensure that air-sensitive materials such as certain highly reactive elemental materials maintain a high purity level during storage and transportation, a need exists for systems and methods for isolating air-sensitive materials and objects from atmospheric conditions.

SUMMARY

Example embodiments of systems, devices, and methods are described herein for the transport and/or storage of an object or materials that are sensitive to atmospheric conditions, such as reactive with oxygen, reactive to moisture, and/or the like.

An example volatile object transport container includes a viewport assembly, a target container housing configured to accommodate clamp assemblies affixable to a volatile object, and a sealing member positioned between the viewport assembly and the target container housing. The sealing member is configured to provide an air-tight seal within an interior cavity of the volatile object transport container when the viewport assembly and target container housing are affixed to one another. The sealing member includes metal. The clamp assemblies are affixed to the volatile object via horizontal holes in a perimeter of the volatile object. At least any surface of the volatile object having thereon a volatile composition is free from contact with any part of the volatile object transport container.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1A:
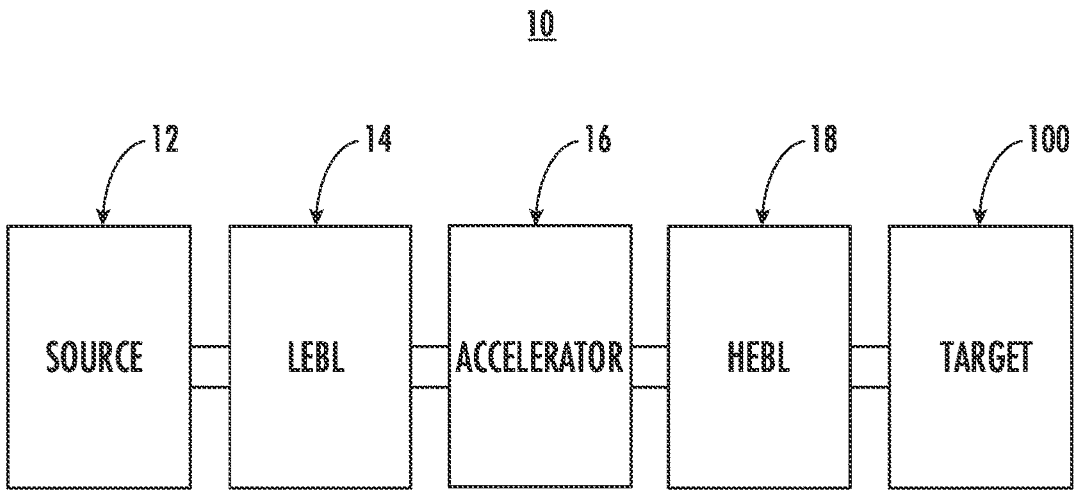
FIG. 1A is a block diagram depicting an example embodiment of a neutron beam system.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

The term "particle" is used broadly herein and, unless otherwise limited, can be used to describe an electron, a proton (or H+ ion), or a neutron, as well as a species having more than one electron, proton, and/or neutron (e.g., other ions, atoms, and molecules).

The term "atmosphere" or "atmospheric air" is used to refer to components of atmospheric air, including, without limitations, oxygen, moisture (e.g., water vapor, humidity, rain, snow, ice, and/or the like), and/or other components of atmospheric air that are reactive with certain compositions.

Example Implementation Environment

Systems that generate energetic particle beams typically include components or devices that receive the beam. These components can be devices used in manipulating or transforming the incoming beam, workpieces altered by the incoming beam, components used for shielding, and others.

An example of one such beam system is a neutron beam system used in boron neutron capture therapy (BNCT). Neutron beam systems used for BNCT typically include a target device that, when impacted by a beam of energetic protons, produces a neutron beam that can treat cancerous tumors. Example target devices are embodied as metallic (e.g., copper) disks having a layer of either lithium or beryllium on one side thereof. For example, lithium targets can generate a beam of epithermal neutrons produced via the nuclear reaction 7Li(p,n)7Be. Target devices are typically integrated into (e.g., removably integrated into) a target assembly that can include secondary structures for supporting use of the target in the overall system, such as a cooling conduit, shielding, structures for engaging and disengaging the assembly, and the like. Moreover, the target assembly is constructed to maintain ideal environmental conditions in its interior, so as to prevent unwanted decomposition/reaction of the materials of the target device. For example, the target assembly may be sufficiently sealed so as to maintain a vacuum environment or to maintain an inert environment therein. The target assembly used to generate the neutrons has a finite lifetime and can require multiple replacements annually. Therefore, replacement target devices are needed, which must be carefully placed into the target assembly when the lifespan of a used target device has been reached.

As just one example, production of a neutron-producing target device for BNCT encompasses processes for creating a layer of highly pure lithium (e.g., having a thickness of approximately 100 micrometers) onto a surface of a metal (e.g., copper) base plate. The process of applying lithium onto the metal base plate typically requires special coating equipment, and therefore this process is generally performed at a manufacturing facility that is not on-site at a location where the BNCT procedures are performed. Once the layer of lithium is applied to the metal base plate, the entire target device must be stored and transported until its installation in a target assembly of a BNCT system.

However, lithium can be extremely difficult to handle, because lithium is highly-reactive and corrosive at atmospheric conditions where the material is exposed to air (including oxygen and moisture within the air) at ambient temperatures, such as in general laboratory environments. When exposed to atmospheric air, lithium reacts with oxygen, nitrogen, and humidity within the air to form a nitride and hydroxide-lithium hydroxide (LiOH and LiOH—$H_2O$), lithium nitride ($Li_3N$), and lithium carbonate ($Li_2CO_3$, a result of a secondary reaction between LiOH and $CO_2$), which can delaminate from a metallic substrate in the form of a dust. The air and moisture act as a catalyst for such a series of reactions.

Preserving the layer of lithium, unspoiled and unreacted, in a transport container with an inert gas or a complete vacuum is an effective method to minimize the potential for exposure to atmospheric air. After application of the lithium (or other highly reactive elemental material to a substrate) under inert gas or vacuum conditions, the resulting target device is placed and sealed into a storage and transport container as discussed herein while remaining under these inert gas or vacuum conditions to maintain the viability of the lithium (or other reactive material) during storage, shipment, and transport.

Example embodiments of systems, devices, and methods are described herein for storage and transportation of manufactured target devices (e.g., manufactured disks having a layer of highly reactive material thereon) within a vacuum or inert gas environment.

Example embodiments overcome shortcomings of existing systems by providing a transport container that can hold the substrate with lithium (e.g., target device) with no mechanical contact of lithium and the container, even during transportation vibration. The transport container is made of metal, creating mechanical protection, and can hold a vacuum while withstanding overpressure (e.g., over 1.5 atm). Example embodiments further provide for a sealed window for target device observation after sealing of the transport container. Example embodiments further provide for a transport container configured to house multiple target devices. Example embodiments further include a metal sealing member, providing for a superior sealing with a very low air diffusivity.

These systems, devices, and/or methods may be usable with target device removal and/or storage systems and methods corresponding with a beam system that includes a particle accelerator. Target devices utilized in association with particle accelerators are just one example, however embodiments as described herein may be configured for providing storage and transportation solutions for devices including highly reactive materials utilized in other intended applications.

Particle accelerators are a common example, and the embodiments described herein can be used with any type of particle accelerator or in any particle accelerator application involving production of a charged particle beam at specified energies for supply to the particle accelerator. Example beam systems are suited to provide a negative particle beam to a tandem accelerator, but this is just an example type of accelerator. The embodiments described herein can be utilized with: beam systems used as scientific tools, such as for nuclear physics research; beam systems used in industrial or manufacturing processes, such as the manufacturing of semiconductor chips; accelerators for the alteration of material properties (such as surface treatment); beam systems for the irradiation of food; beam systems for pathogen destruction in medical sterilization; and surface science, including the study of samples utilizing X-rays and/or any type of ion beams, including SIMS and similar techniques, the study of samples under electron beam (e.g. SEM and TEM), and on the like. The embodiments can also be used in combination with imaging applications, such as cargo or container inspection. And by way of another non-exhaustive example, the embodiments can be used in combination with beam systems for medical applications, such as medical diagnostic systems, medical imaging systems, or radiation therapy systems. Again however, use of various embodiments in association with beam systems is just one example, and other embodiments may be configured for use in association with other industries, such as the manufacture of lithium-ion batteries, and/or other industrial applications requiring storage and/or transportation of materials that are highly reactive under atmospheric conditions.

For context, one application of embodiments as discussed herein is the storage and transport of target devices utilized in a radiation therapy system such as a BNCT system. For ease of description, many embodiments described herein will be done so in the context of a neutron beam system for use in BNCT, although the embodiments are not limited to just neutron beams nor BNCT applications.

Example BNCT Applications

FIG. 1A is a schematic diagram of an example embodiment of a beam system 10 for use with embodiments of the present disclosure. In FIG. 1A, beam system 10 includes a source 12, a low-energy beamline (LEBL) 14, an accelerator 16 coupled to the low-energy beamline (LEBL) 14, and a high-energy beamline (HEBL) 16 extending from the accelerator 16 to a target 100. LEBL 14 is configured to transport a beam from source 12 to an input of accelerator 16, which in turn is configured to produce a beam by accelerating the beam transported by LEBL 14. HEBL 18 transfers the beam from an output of accelerator 40 to target 100. Target 100 can be a structure configured to produce a desired result in response to the stimulus applied by the incident beam, or can modify the nature of the beam. Target 100 can be a component of system 10 or can be a workpiece that is conditioned or manufactured, at least in part, by system 10.

Figure 1B:
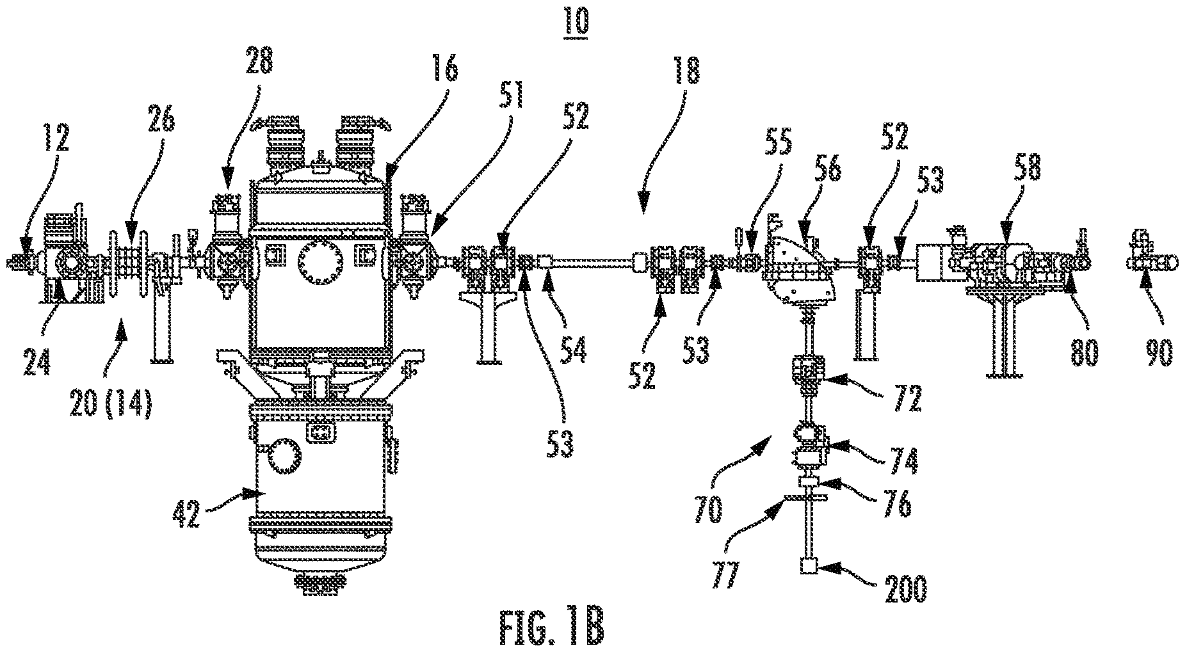
FIG. 1B is a schematic diagram depicting another example embodiment of a neutron beam system.
Figure 2A:
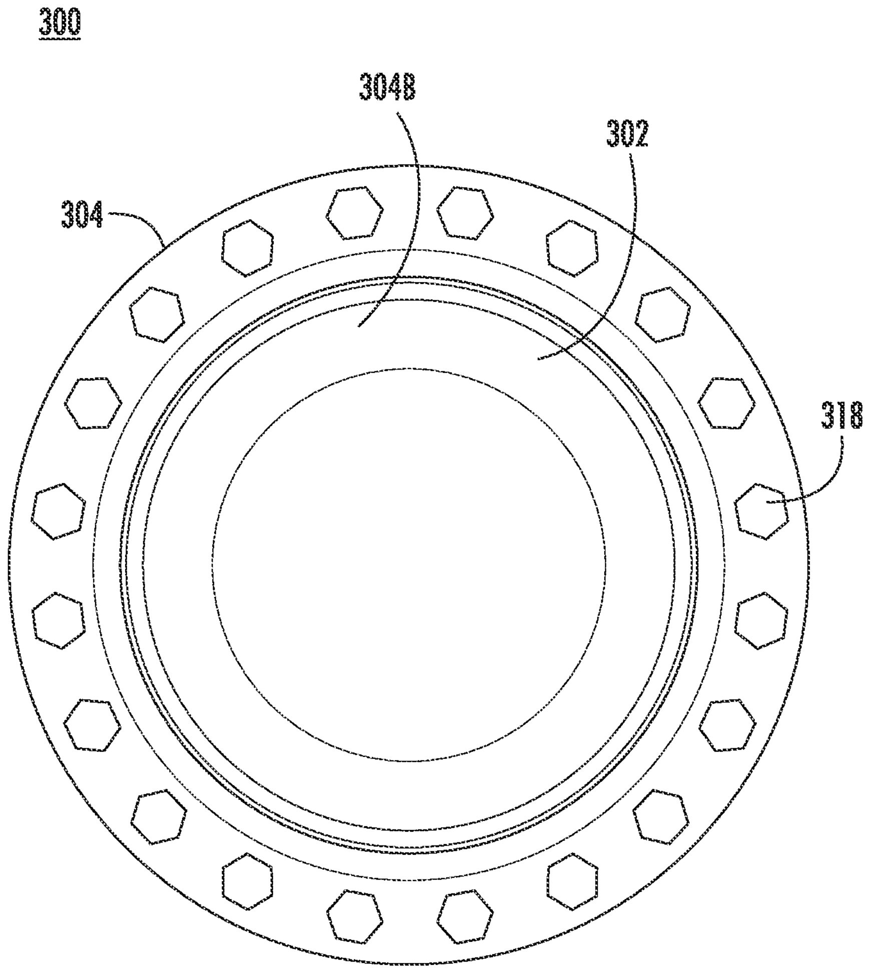
FIG. 2A depicts an example transport apparatus or container enclosing a target device, in accordance with example embodiments.
Figure 2B:
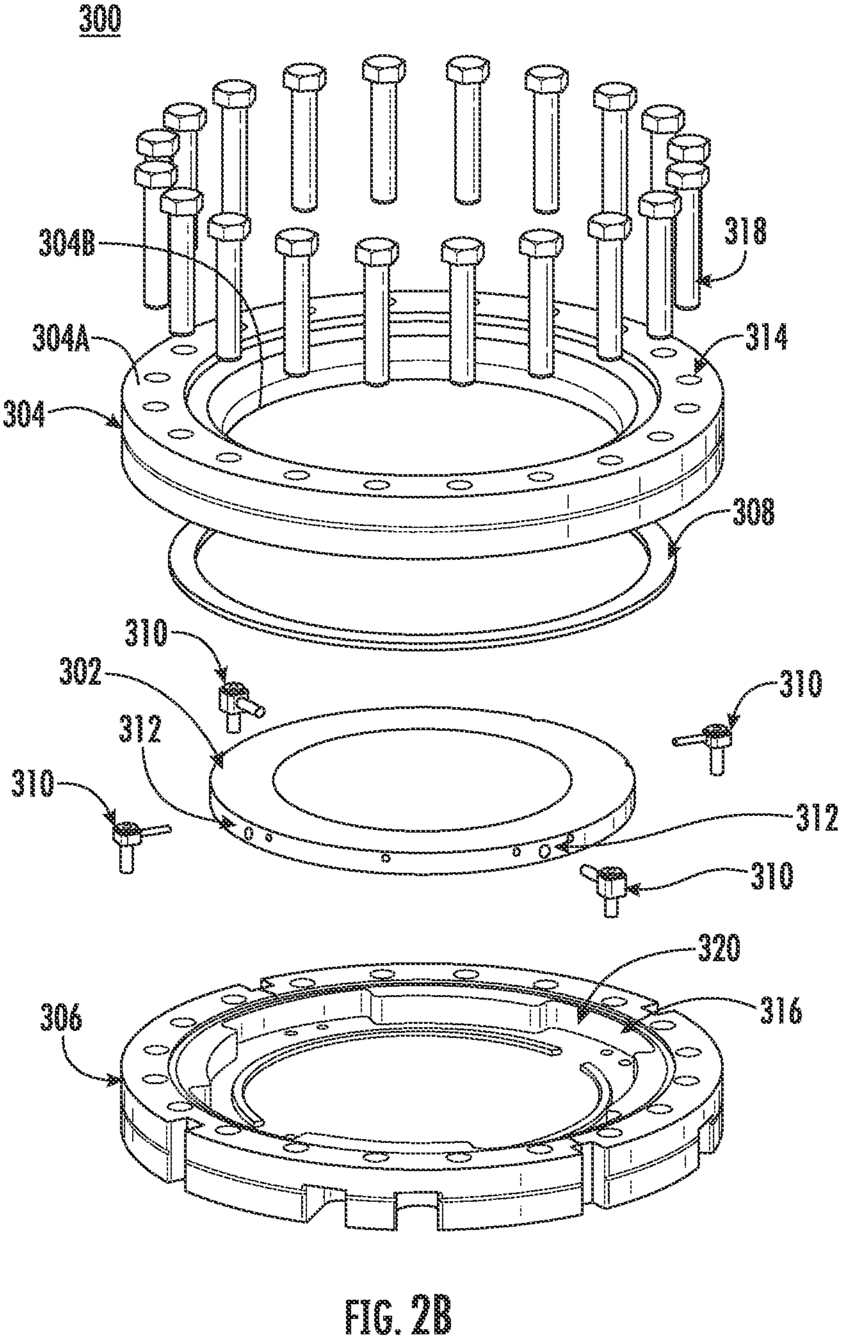
FIG. 2B is an exploded view of an example transport apparatus or container enclosing a target device, in accordance with example embodiments.
Figure 2C:
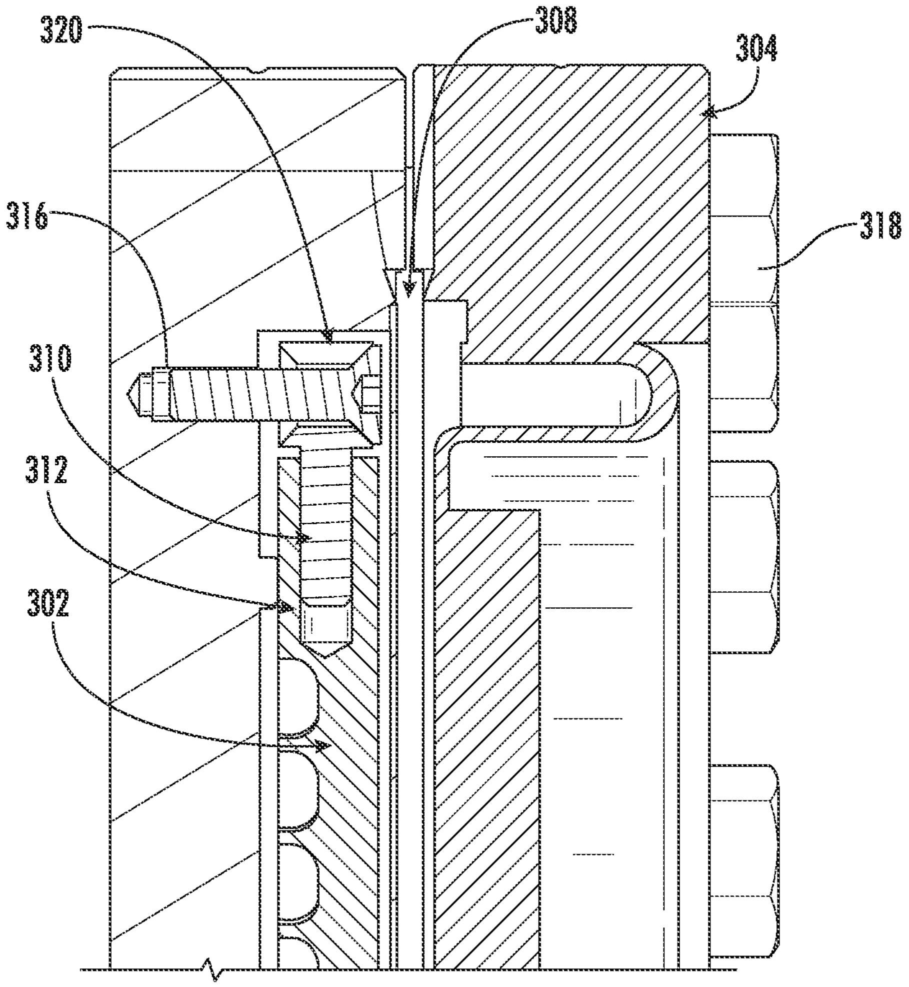
FIG. 2C depicts an example transport apparatus or container enclosing a target device, in accordance with example embodiments.
Figure 2D:
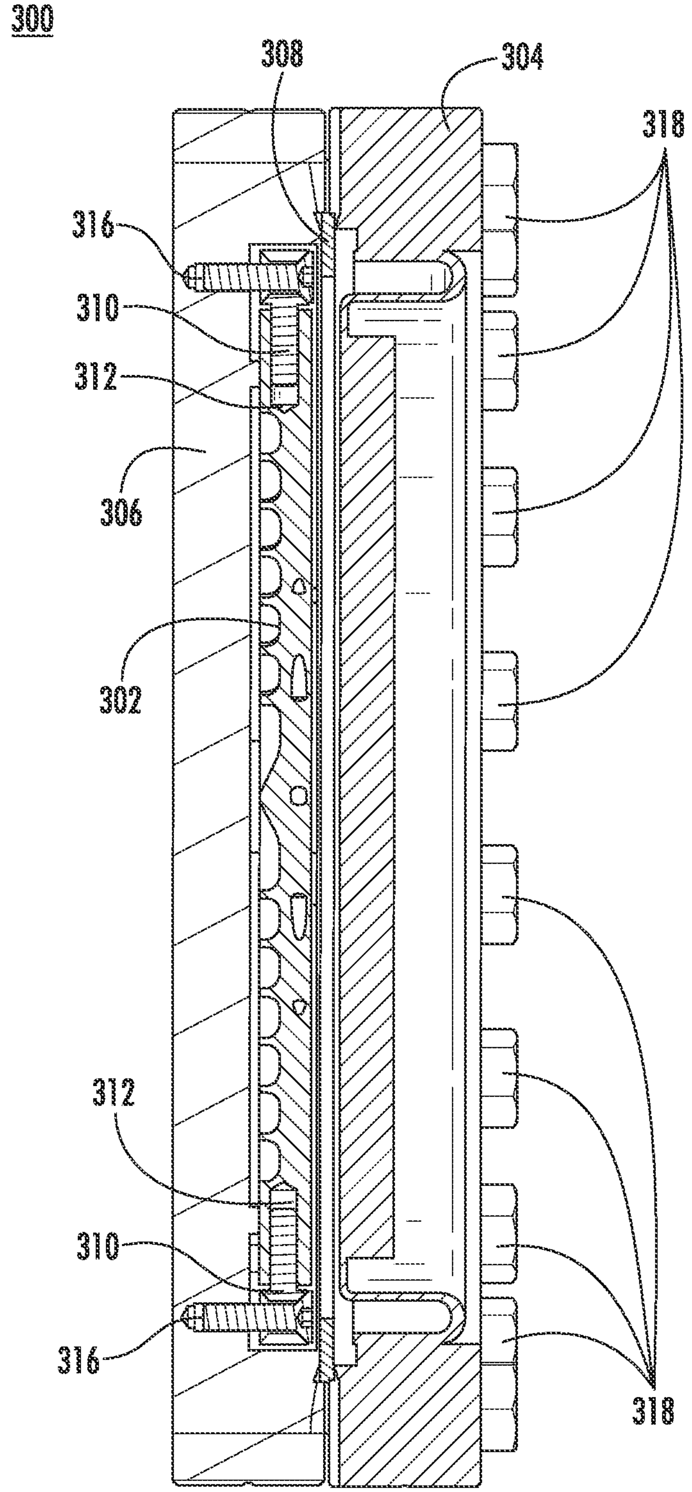
FIG. 2D depicts an example transport apparatus or container enclosing a target device, in accordance with example embodiments.
Figure 2E:
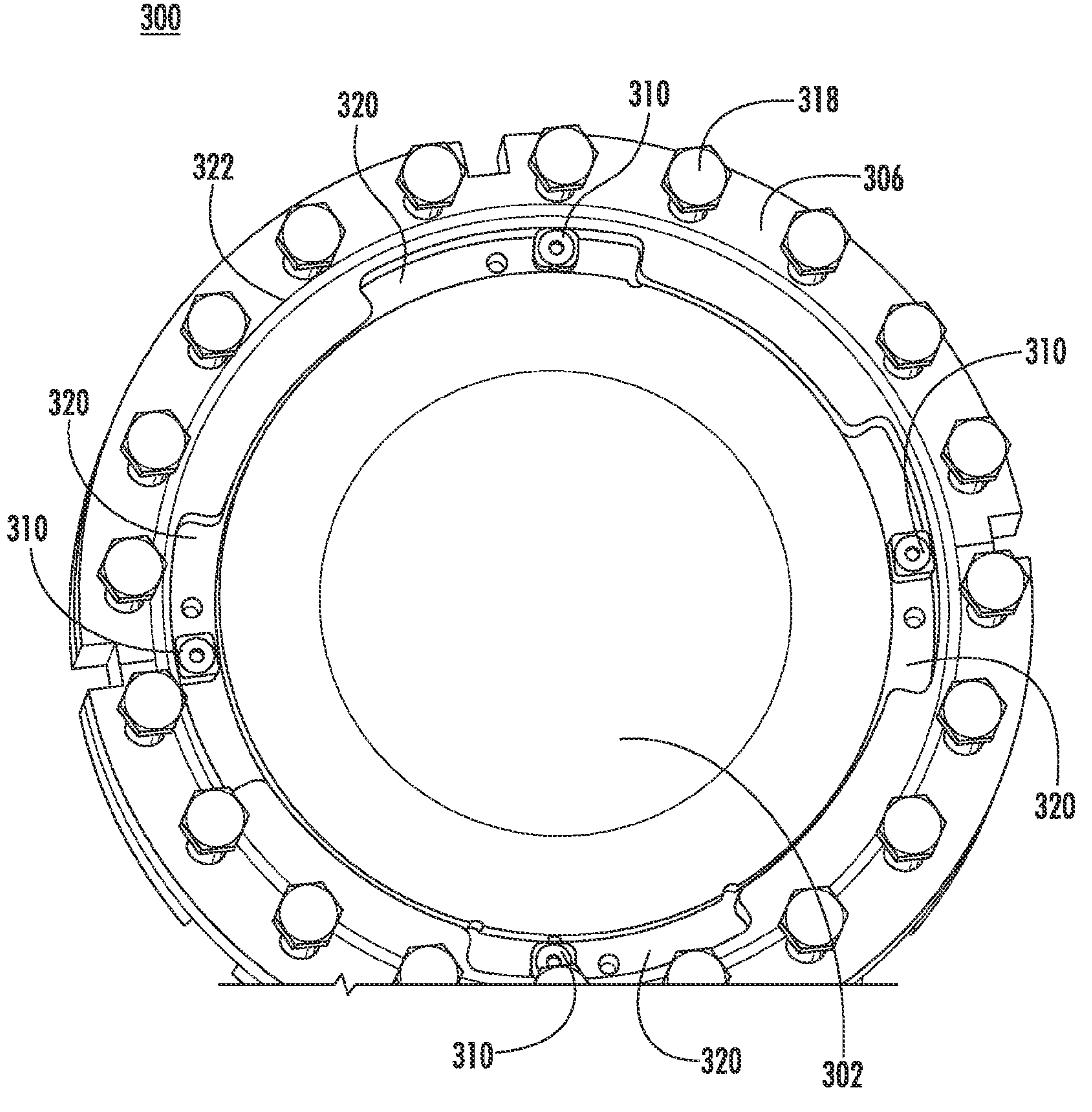
FIG. 2E depicts an example transport apparatus or container enclosing a target device, in accordance with example embodiments.
Figure 2F:
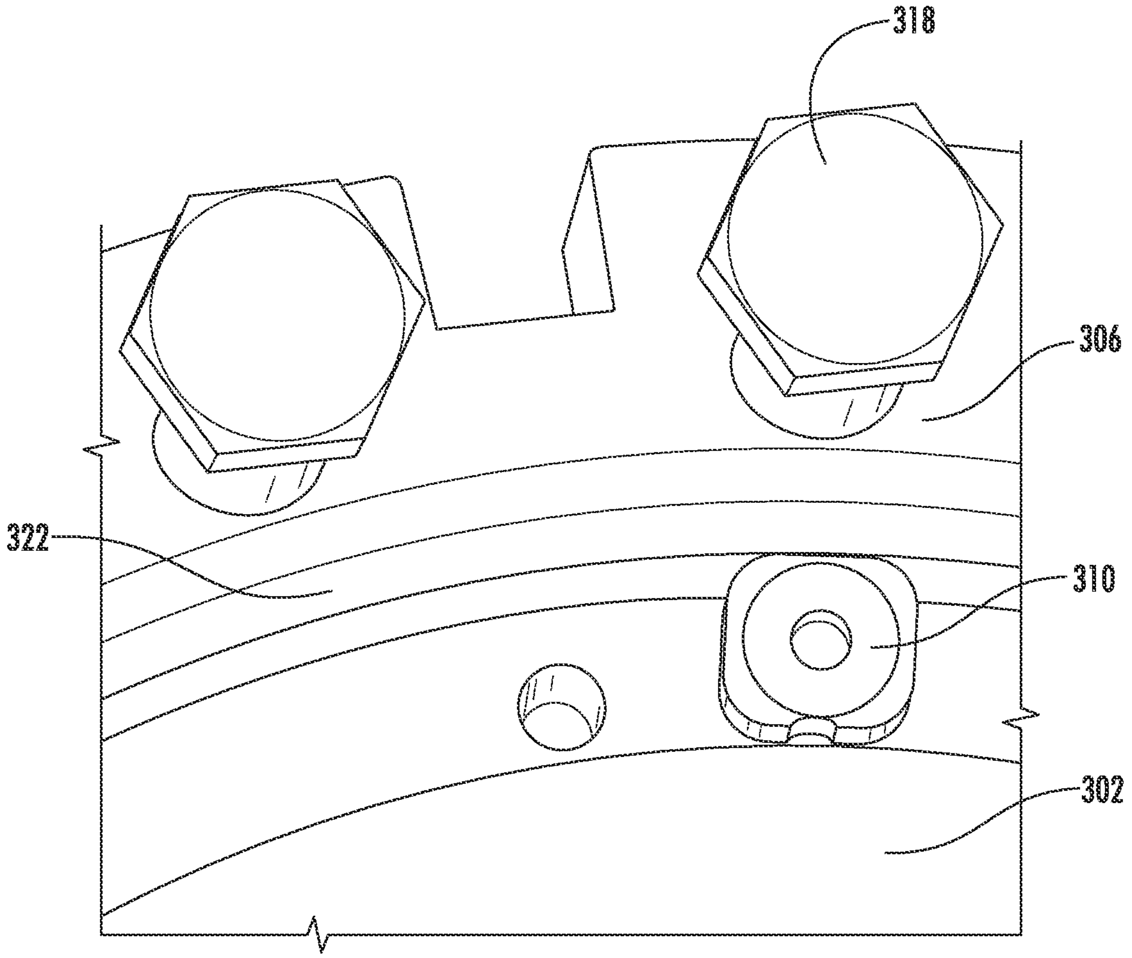
FIG. 2F depicts an example transport apparatus or container enclosing a target device, in accordance with example embodiments.
Figure 2G:
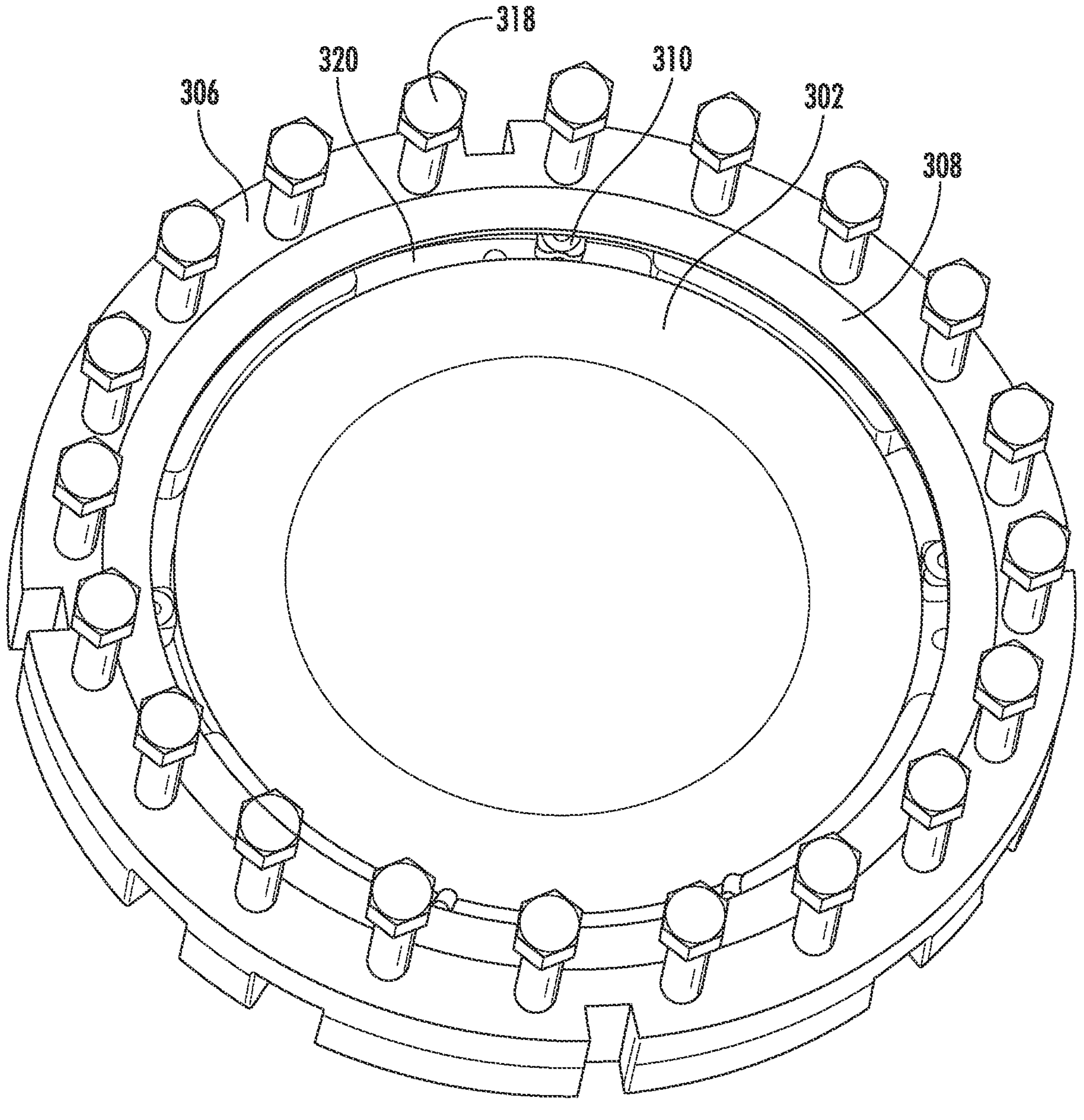
FIG. 2G depicts an example transport apparatus or container enclosing a target device, in accordance with example embodiments.
Figure 2H:
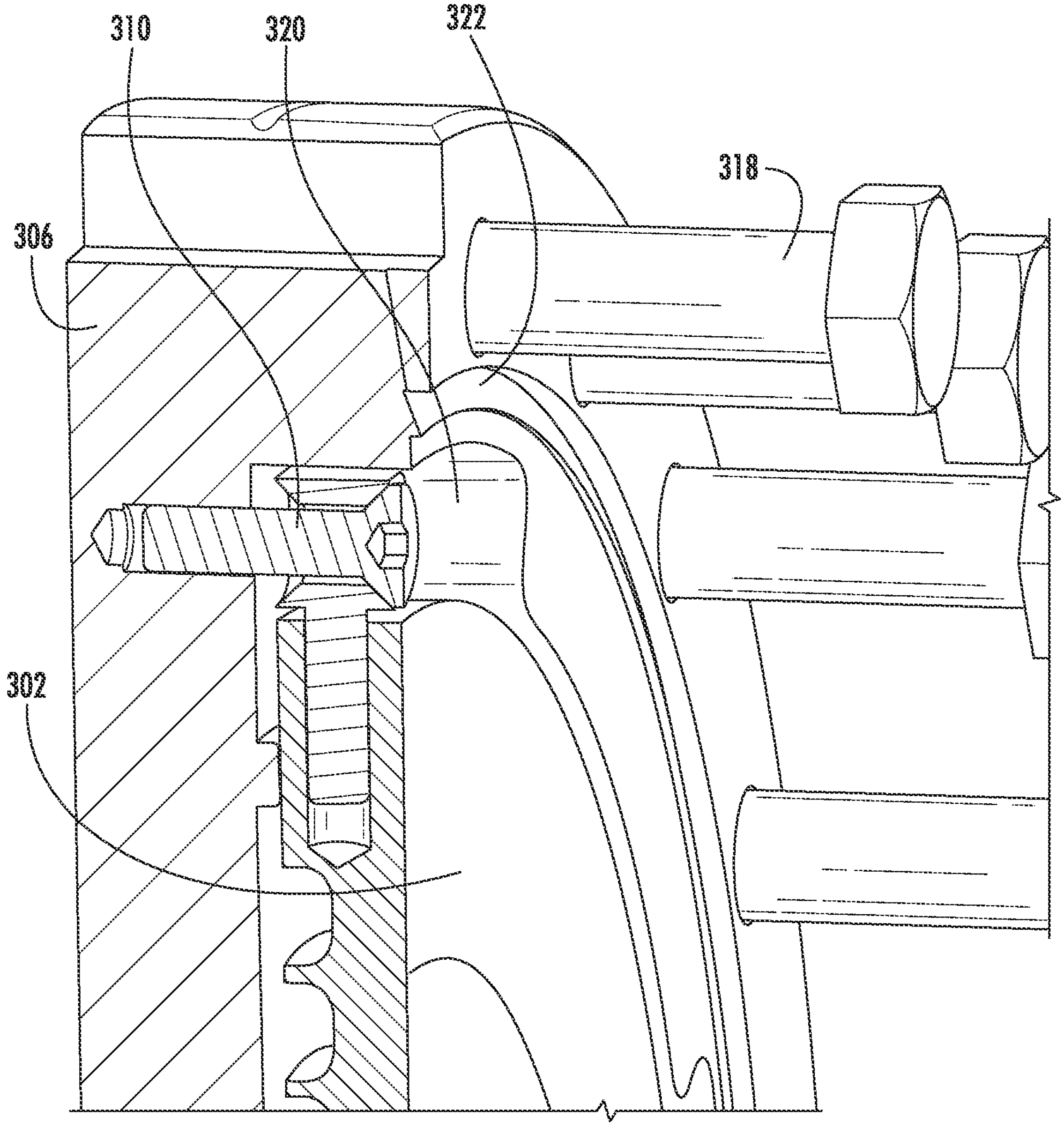
FIG. 2H depicts an example transport apparatus or container enclosing a target device, in accordance with example embodiments.
Figure 2I:
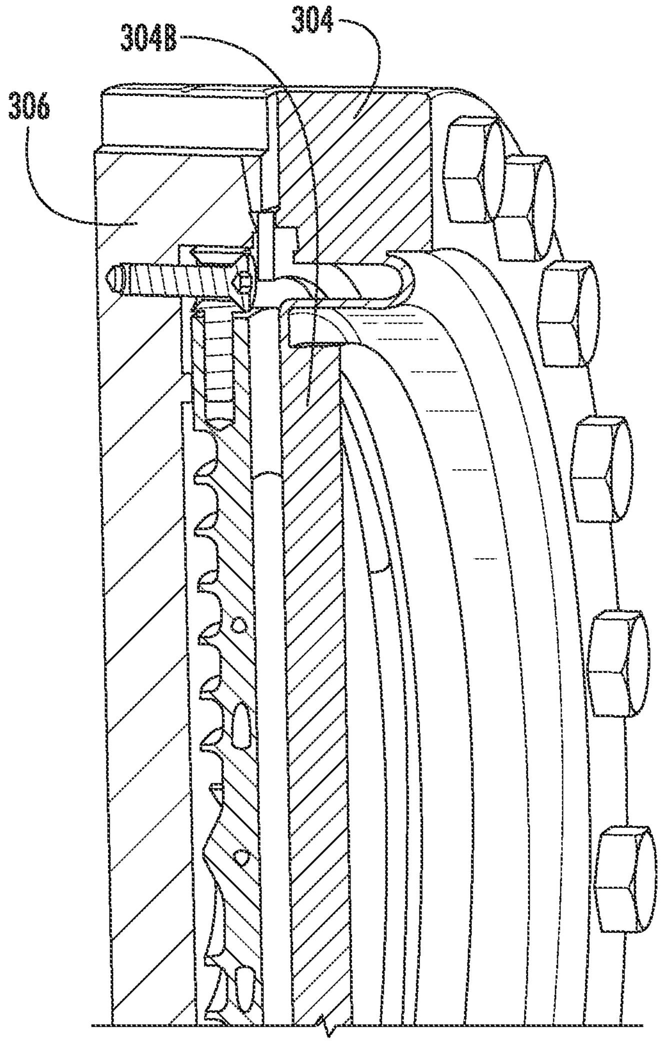
FIG. 2I depicts an example transport apparatus or container enclosing a target device, in accordance with example embodiments.

FIG. 1B is a schematic diagram illustrating another example embodiment of a neutron beam system 10 for use in boron neutron capture therapy (BNCT). Here, source 12 is an ion source and accelerator 16 is a tandem accelerator. Neutron beam system 10 includes a pre-accelerator system 20, serving as a charged particle beam injector, high voltage (HV) tandem accelerator 16 coupled to pre-accelerator system 20, and HEBL 18 extending from tandem accelerator 16 to a neutron target assembly 200 housing target 100 (not shown). In this embodiment target 100 is configured to generate neutrons in response to impact by protons of a sufficient energy, and can be referred to as a neutron generation target. Neutron beam system 10 as well as pre-accelerator system 20 can also be used for other applications such as those other examples described herein, and is not limited to BNCT.

Pre-accelerator system 20 is configured to transport the ion beam from ion source 12 to the input (e.g., an input aperture) of tandem accelerator 16, and thus also acts as LEBL 14. Tandem accelerator 16, which is powered by a high voltage power supply 42 coupled thereto, can produce a proton beam with an energy generally equal to twice the voltage applied to the accelerating electrodes positioned within accelerator 16. The energy level of the proton beam can be achieved by accelerating the beam of negative hydrogen ions from the input of accelerator 16 to the innermost high-potential electrode, stripping two electrons from each ion, and then accelerating the resulting protons downstream by the same applied voltage.

HEBL 18 can transfer the proton beam from the output of accelerator 16 to the target within neutron target assembly 200 positioned at the end of a branch 70 of the beamline extending into a patient treatment room. System 10 can be configured to direct the proton beam to any number of one or more targets and associated treatment areas. In this embodiment, the HEBL 18 includes three branches 70, 80 and 90 that can extend into three different patient treatment rooms, where each branch can terminate in a target assembly 200 and downstream beam shaping apparatus (not shown) HEBL 18 can include a pump chamber 51, quadrupole magnets 52 and 72 to prevent de-focusing of the beam, dipole or bending magnets 56 and 58 to steer the beam into treatment rooms, beam correctors 53, diagnostics such as current monitors 54 and 76, a fast beam position monitor 55 section, and a scanning magnet 74.

The design of HEBL 18 depends on the configuration of the treatment facility (e.g., a single-story configuration of a treatment facility, a two-story configuration of a treatment facility, and the like). The beam can be delivered to target assembly (e.g., positioned near a treatment room) 200 with the use of bending magnet 56. Quadrupole magnets 72 can be included to then focus the beam to a certain size at the target. Then, the beam passes one or more scanning magnets 74, which provides lateral movement of the beam onto the target surface in a desired pattern (e.g., spiral, curved, stepped in rows and columns, combinations thereof, and others). The beam lateral movement can help achieve smooth and even time-averaged distribution of the proton beam on the lithium target, preventing overheating and making the neutron generation as uniform as possible within the lithium layer.

After entering scanning magnets 74, the beam can be delivered into a current monitor 76, which measures beam current. Target assembly 200 can be physically separated from the HEBL volume with a gate valve 77. The main function of the gate valve is separation of the vacuum volume of the beamline from the target while loading the target and/or exchanging a used target for a new one. In embodiments, the beam may not be bent by 90 degrees by a bending magnet 56, it rather goes straight to the right of FIG. 1B, then enters quadrupole magnets 52, which are located in the horizontal beamline. The beam could be subsequently bent by another bending magnet 58 to a needed angle, depending on the building and room configuration. Otherwise, bending magnet 58 could be replaced with a Y-shaped magnet in order to split the beamline into two directions for two different treatment rooms located on the same floor.

Example Embodiments of a Transport Apparatus

To minimize a risk of subjecting replacement target devices 302 (or other volatile objects) to potentially damaging reactions in an atmospheric environment, the target devices 302 are maintained in vacuum and/or inert environments during manufacture, storage, transportation, installation into a target assembly 200, and use. The target assembly 200 itself is configured to maintain a vacuum environment around the target device 302 even while the target assembly 200 is not installed within the particle accelerator. However, replacement target devices 302 must be transported from a manufacturing location to an installation location where the target devices 302 are exposed to a surrounding environment while the target assembly 200 is opened and the target device 302 is inserted into the target assembly 200. To maintain a vacuum or inert environment surrounding the target device 302 during storage and transportation, a transport container or apparatus 300 is provided herein that securely stores a target device 302 while maintaining a vacuum or inert environment therein.

FIGS. 2A-2I depict an example transport apparatus or container 300 enclosing a target device 302, in accordance with embodiments of the present disclosure. The illustrated transport apparatus 300 is housing a volatile object embodied as a target device 302 shown within an interior thereof. It should be understood that other volatile objects (e.g., disks of solid volatile material, slurries of volatile material, and/or the like) may be stored within a transport apparatus 300 according to certain embodiments.

As shown in FIGS. 2A-2I, the target device 302 is embodied as a disk (e.g., an at least substantially circular disk) having a first surface (not shown) and an opposite second surface (not shown), separated by a perimeter edge. The disk may include a metallic material, such as copper, although other metal materials may be utilized for various target device 302 configurations. Moreover, the target device 302 may additionally include a volatile composition (e.g., lithium, magnesium, sodium, and/or the like) coated onto the first surface of the disk. The coating may extend to edges of the first surface of the disk, or edges of the coating may be spaced a distance internal to the edge of the disk, such that a ring of exposed metal material surround the coating on the first surface. In any case, the edges of the disk as well as the coating can be protected from contact with any part of the transport container 300.

The target device 302 includes multiple holes 312 spaced along its perimeter, where the holes 312 may be drilled into the target device 302 for use in obtaining diagnostic or beam parameter data during beam operation. The holes 312 can additionally or alternatively be used in conjunction with the transport apparatus 300 such that target clamp and screw assemblies 310 can be secured into the holes 312 (e.g., by way of screws or fasteners) and also secured to holes 316 (e.g., by way of clamps or other screws or fasteners) of a target container housing 306 of the transport apparatus 300. The target container housing 306 further includes insets 320 in its first or upper surface that can accommodate the target clamp and screw assemblies 310. It will be appreciated that the holes 312 penetrate the perimeter of the target device 302 from an outer edge of the perimeter and horizontally toward a center of the target device 302. Holes 316 penetrate a first, upper surface of the target container housing 306 vertically toward a second or bottom surface of the target container housing 306.

The transport container 300 further includes a viewport assembly 304 includes a rigid ring 304A having vertical holes 314 around its perimeter so that screws or fasteners 318 can be used to secure the viewport assembly 304 to the target container housing 306. The viewport assembly 304 includes a transparent layer 304B so that the target device 302 can be observed after the transport container 300 is assembled and sealed. The example transparent layer 304B can be made from any suitable material for maintain integrity of the container 300 and target device 302 under vacuum and other conditions, including glass, silicate glass, or borosilicate glass. The transparent layer 304B can be coated along its perimeter with a metal material and bonded to the rigid ring 304A. In some embodiments, the transparent layer 304B is bonded to the rigid ring 304A by vacuum brazing.

In the illustrated embodiments of FIGS. 2A-2I, each of the target container housing 306 and the viewport assembly 304 have an at least substantially circular shape. However, it should be understood that other shapes may be usable, with the target container housing 306 and the viewport assembly 304 having matching shapes enabling sealing surfaces of each of the target container housing 306 and the viewport assembly 304 to engage relative to one another so as to form an air-tight seal therebetween. In embodiments, the target container housing 306 and the viewport assembly 304 are made from stainless steel or other suitable materials (with the exception of the transparent layer 304B, in certain embodiments having the transparent layer 304B).

The target container housing 306 and the viewport assembly 304 define an exterior surface and an opposite interior portion. The interior portion forms an enclosed interior volume of the transport container 300 within which the volatile object (e.g., target device 302) may be positioned. Moreover, an inset channel 322 is formed surrounding the interior surface of the interior portion. A sealing member 308 seats into the inset channel 322. The sealing member 308 can be a metal sealing ring. The sealing member 308 can be composed of a metal (e.g., copper) that is relatively softer or more pliable than the material of the housing. Metal acts as a better seal guarding against diffusion from the exterior of the transport container 300 as compared to a polymer or viton sealing ring, and the metals lack of porosity eliminates potential for air trapped in an otherwise porous sealing material to come into contact with the lithium of the target device 302.

In certain embodiments, the transport container 300 is configured to accommodate multiple target devices 302. In such examples, the transport container 300 is configured such that the multiple target devices 302 are secured during transport and are not subjected to vibration or other movement during transport. Further, the transport container 300 is configured such that no part of the container 300 is in contact with the air-sensitive material of any of the target devices positioned therein.

In certain embodiments, the transport container 300 is configured to withhold overpressure. That is, air diffusion from outside of the transport container 300 to inside the transport container 300 is avoided by pumping over-pressurized insert gas in the transport container.

Figure 3A:
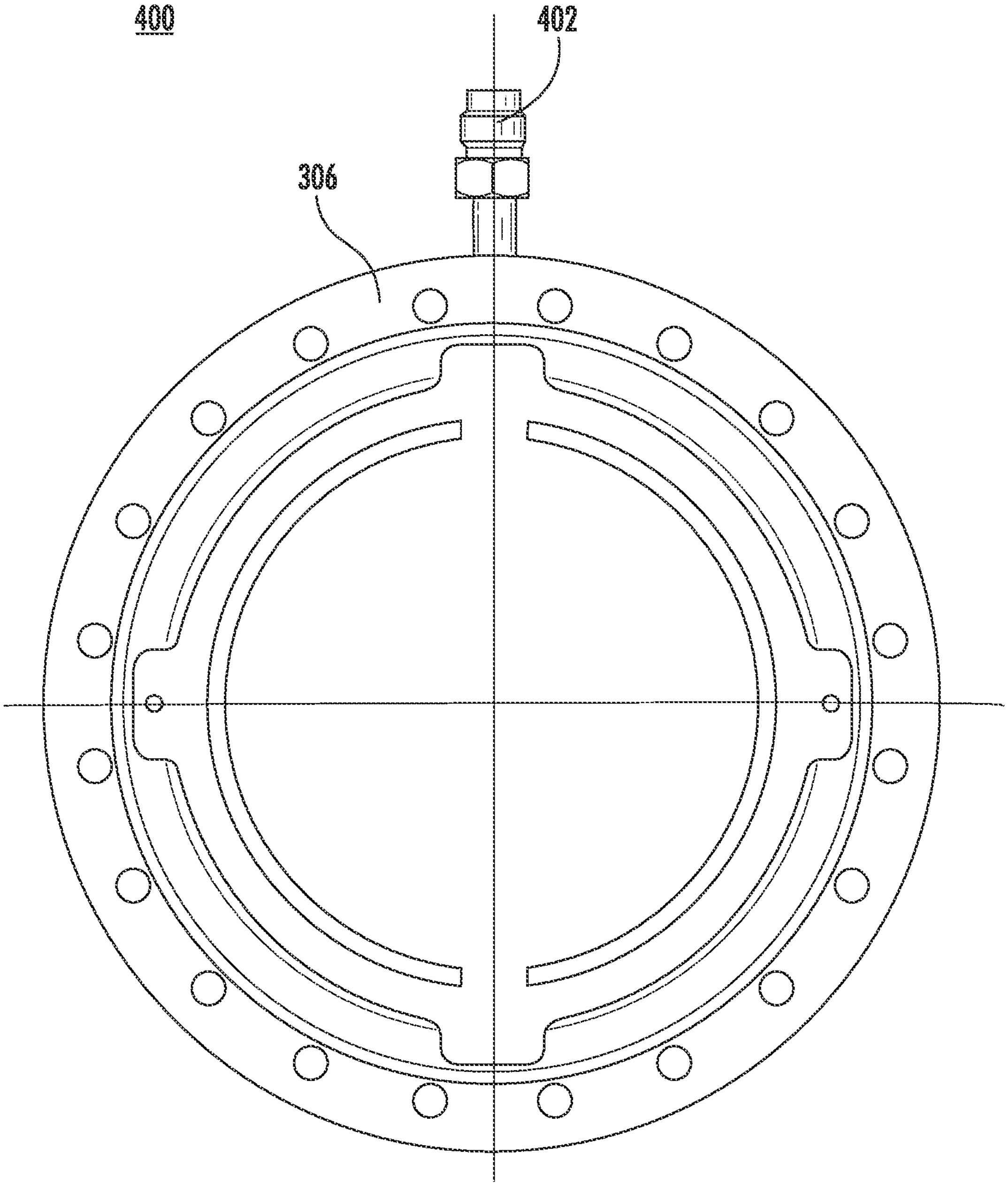
FIG. 3A depicts an example transport apparatus or container enclosing a target device, in accordance with example embodiments.
Figure 3B:
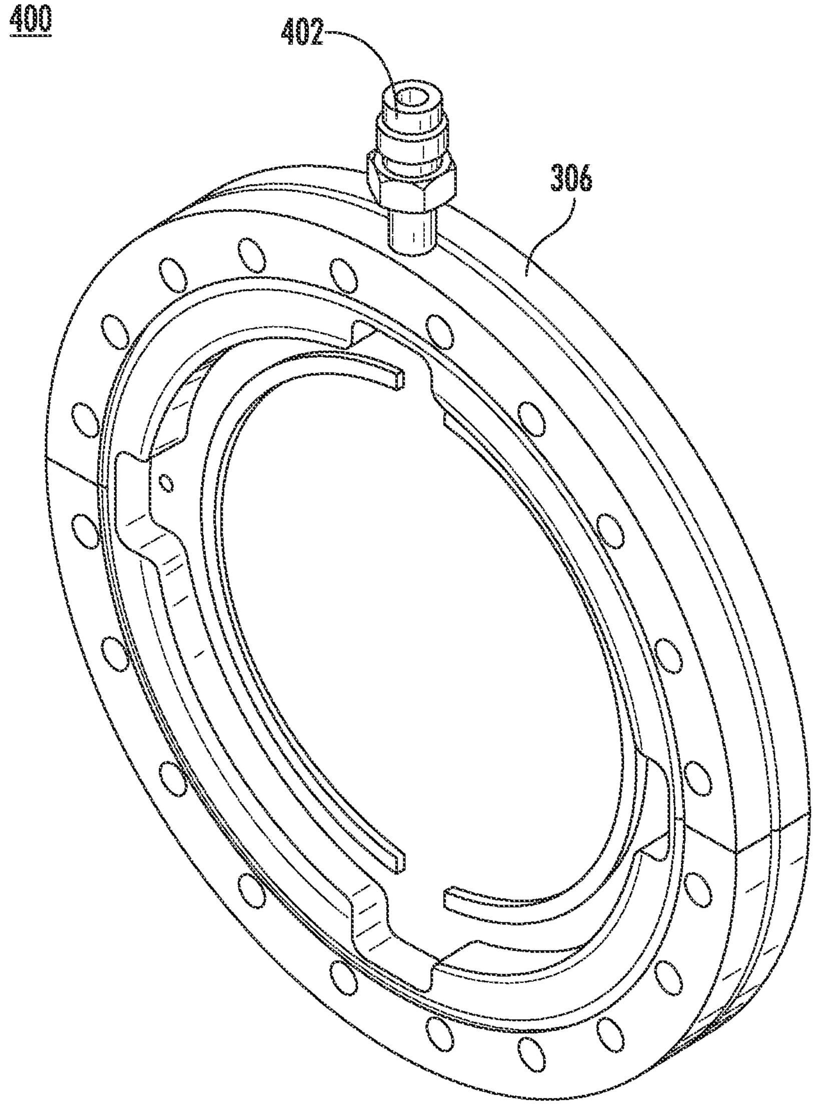
FIG. 3B depicts an example transport apparatus or container enclosing a target device, in accordance with example embodiments.
Figure 3C:
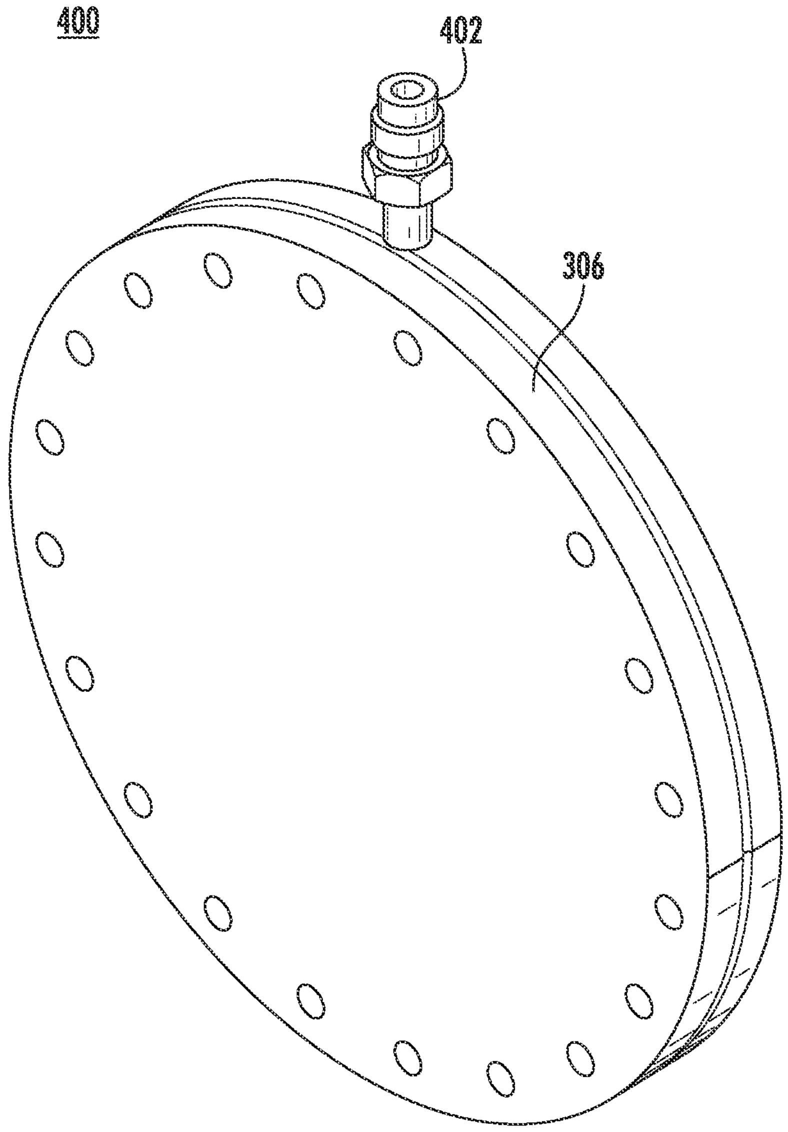
FIG. 3C depicts an example transport apparatus or container enclosing a target device, in accordance with example embodiments.

FIGS. 3A-3C depict an example transport container 400 in accordance with example embodiments. In FIGS. 3A-3C, components of the example transport container 400 are similar to those depicted with respect to example transport container 300, and therefore most components will not be described again. In various embodiments of example transport container 400, a pumping port 402 can be radially attached to the target container housing 306 so that the transport container 400 may be sealed and transported under vacuum or near-vacuum conditions. The pumping port 402 can be welded into the side of the target container housing 306. The pumping port 402 can be used to create or ensure a vacuum environment within an interior of the transport container 400.

Example Methods of Use and Further Embodiments

As a method of using the transport container 300, after the air-sensitive material can be adhered to the base resulting in the volatile object or target device 302, target clamp and screw assemblies 310 can be secured into the holes 312 of the target device 302. The target device 302 can then be placed into an interior of the transport container 300 while the transport container 300 is in an open configuration with the viewport assembly 304 separated from the target container housing 306. In use, the target device 302 is placed into the interior of the transport container 300 while the volatile object and the transport container 300 are positioned within a highly pure inert gas environment (e.g., moisture and oxygen content less than 0.5 ppm), such as within a glovebox operated under inert gas (e.g., argon). Alternatively, in embodiments employing a pumping port 402, the target device 302 is placed into the interior of the transport container 400 while the volatile object and the transport container 400 are positioned within a vacuum environment, such as within a glovebox operated under vacuum pressure.

When the target device 302 is placed into the interior of the transport container 300, the target clamp and screw assemblies 310 can be secured into holes 316 of the target container housing 306, positioned within insets 320 of the target container housing 306. The sealing member 308 can be positioned around the perimeter of the target container housing 306, and the viewport assembly 304 can be positioned onto the sealing member 308. The fasteners 318 are positioned through the holes 314 of the viewport assembly 304. The fasteners 318 can be tightened (e.g., by mechanical forces) to compress and seal the transport container 300, creating an air-tight enclosure for the target device 302. The sealed transport container 300 can then be removed from the inert gas environment.

As a result of the configuration herein, no part of the transport container 300 is in contact with the air-sensitive material nor with an exterior edge of either surface of the target device 302. The seal of the transport container 300 creates a suspension-like position for the target device 302, preventing it from rattling or shaking during transport.

In embodiments employing a pumping port 402, the sealed transport container 400 can then be removed from the vacuum environment, thereby subjecting the transport container 400 to a pressure differential with the pressure external to the transport container 400 being higher than the vacuum pressure within the enclosed interior volume of the transport container 400. This pressure differential creates an additional holding force sealing the transport container 400 in the sealed configuration.

To open the sealed transport container 300, such as when removing an enclosed target device 302 for installation within a target assembly 200, the transport container 300 can be placed into an inert environment (e.g., argon). The viewport assembly 304 is then loosened and removed from the target container housing 306. The sealing member 308 is removed, and the target device 302 can be removed from the target container housing by removing the target clamp and screw assemblies 310 from the target container housing 306 and then from the target device 302. The target device 302 can then be freely removed, such as for installation into a target assembly 200.

In embodiments employing a pumping port 402, to open the sealed transport container 400, the transport container 400 can be placed into a vacuum or near vacuum environment (e.g., $10^{-5}$ torr or better), such that the pressure external to the transport container 400 is at least substantially equal to the pressure within the enclosed interior volume of the transport container 400. The viewport assembly 304 is then loosened and removed from the target container housing 306. The sealing member 308 is removed, and the target device 302 can be removed from the target container housing by removing the target clamp and screw assemblies 310 from the target container housing 306 and then from the target device 302. The target device 302 can then be freely removed, such as for installation into a target assembly 200.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In some embodiments, a volatile object transport container includes a viewport assembly, a target container housing configured to accommodate multiple clamp assemblies affixable to a volatile object, and a sealing member positioned between the viewport assembly and the target container housing. In some of these embodiments, the sealing member is configured to provide an air-tight seal within an interior cavity of the volatile object transport container when the viewport assembly and target container housing are affixed to one another.

In some of these embodiments, the viewport assembly includes a transparent viewing layer.

In some of these embodiments, the sealing member includes metal. In some of these embodiments, the metal includes copper.

In some of these embodiments, the multiple clamp assemblies are affixed to the volatile object via multiple horizontal holes in a perimeter of the volatile object. In some of these embodiments, the multiple clamp assemblies are affixed to the target container housing via multiple vertical holes in a first surface of the target container housing.

In some of these embodiments, the volatile object includes a metallic substrate and a volatile composition layer. In some of these embodiments, the metallic substrate includes copper.

In some of these embodiments, the volatile composition includes one of: lithium, sodium, or magnesium.

In some of these embodiments, the viewport assembly includes multiple vertical holes positioned along a perimeter of the viewport assembly. In some of these embodiments, fasteners affix the viewport assembly to the target container housing via the multiple vertical holes of the viewport assembly.

In some of these embodiments, the viewport assembly, the sealing member, and the target container housing have an at least substantially circular shape.

In some of these embodiments, at least any surface of the volatile object having thereon a volatile composition is free from contact with any part of the volatile object transport container.

In some of these embodiments, the volatile object is configured to produce a neutron beam when impacted by a beam of energetic protons.

In some of these embodiments, the volatile object transport container further includes a pumping port radially extending from the target container housing.

In some embodiments, a method of storing a volatile object in a volatile object transport container includes affixing multiple clamp assemblies to the volatile object, affixing the multiple clamp assemblies to a target container housing of the volatile object transport container, placing a sealing member around a perimeter of the target container housing such that the sealing member is free from contact with the volatile object, placing a viewport assembly of the volatile object transport container onto the sealing member, and sealing the volatile object transport container using mechanical forces such that the volatile object is free from contamination within the volatile transport container due to an air-tight seal.

In some of these embodiments, the volatile object is placed into volatile object transport container and the volatile object transport container is sealed in a vacuum or inert environment.

In some of these embodiments, the viewport assembly includes a transparent viewing layer.

In some of these embodiments, the sealing member includes metal. In some of these embodiments, the metal includes copper.

In some of these embodiments, the method further includes affixing the multiple clamp assemblies to the volatile object via multiple horizontal holes in a perimeter of the volatile object. In some of these embodiments, the method further includes affixing the multiple clamp assemblies to the target container housing via multiple vertical holes in a first surface of the target container housing.

In some of these embodiments, the volatile object includes a metallic substrate and a volatile composition layer. In some of these embodiments, the metallic substrate includes copper. In some of these embodiments, the volatile composition includes one of: lithium, sodium, or magnesium.

In some of these embodiments, the viewport assembly includes multiple vertical holes positioned along a perimeter of the viewport assembly. In some of these embodiments, sealing the volatile object transport container using mechanical forces includes affixing the viewport assembly to the target container housing via the multiple vertical holes of the viewport assembly.

In some of these embodiments, at least any surface of the volatile object having thereon a volatile composition is free from contact with any part of the volatile object transport container.

In some embodiments, a volatile object transport container includes a metal sealing member configured to provide an air-tight seal within an interior cavity of the volatile object transport container.

In some embodiments, a volatile object transport container includes a viewport assembly affixable to a target container housing of the volatile object transport container.

In some embodiments, a volatile object transport container includes a target container housing configured to accommodate multiple clamp assemblies affixable to a volatile object.

In some embodiments, a method of storing a volatile object in a volatile object transport container includes affixing multiple clamp assemblies to the volatile object, affixing the multiple clamp assemblies to a target container housing of the volatile object transport container, and sealing the volatile object transport container using mechanical forces such that the volatile object is free from contamination within the volatile transport container due to an air-tight seal.

In some embodiments, a method of storing a volatile object in a volatile object transport container includes placing a metal sealing member around a perimeter of the target container housing such that the sealing member is free from contact with the volatile object, and sealing the volatile object transport container using mechanical forces such that the volatile object is free from contamination within the volatile transport container due to an air-tight seal.

In some embodiments, a method of storing a volatile object in a volatile object transport container includes placing a viewport assembly of the volatile object transport container onto a sealing member, and sealing the volatile object transport container using mechanical forces such that the volatile object is free from contamination within the volatile transport container due to an air-tight seal.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A volatile object transport container, comprising:

a viewport assembly;

a target container housing configured to accommodate a plurality of clamp assemblies affixable to a volatile object, wherein the plurality of clamp assemblies are (i) affixed to the volatile object via a plurality of horizontal holes in a perimeter of the volatile object and (ii) affixed to the target container housing via a plurality of vertical holes in a first surface of the target container housing; and a sealing member positioned between the viewport assembly and the target container housing, wherein the sealing member is configured to provide an air-tight seal within an interior cavity of the volatile object transport container when the viewport assembly and target container housing are affixed to one another.

2. The volatile object transport container of claim 1, wherein the viewport assembly comprises a transparent viewing layer.

3. The volatile object transport container of claim 1, wherein the sealing member comprises metal.

4. The volatile object transport container of claim 3, wherein the metal comprises copper.

5. The volatile object transport container of claim 1, wherein the volatile object comprises a metallic substrate and a volatile composition layer.

6. The volatile object transport container of claim 5, wherein the metallic substrate comprises copper.

7. The volatile object transport container of claim 5, wherein the volatile composition layer comprises one of: lithium, sodium, or magnesium.

8. The volatile object transport container of claim 1, wherein the viewport assembly comprises a plurality of vertical holes positioned along a perimeter of the viewport assembly.

9. The volatile object transport container of claim 8, wherein fasteners affix the viewport assembly to the target container housing via the plurality of vertical holes of the viewport assembly.

10. The volatile object transport container of claim 1, wherein the viewport assembly, the sealing member, and the target container housing have an at least substantially circular shape.

11. The volatile object transport container of claim 1, wherein at least any surface of the volatile object having thereon a volatile composition is free from contact with any part of the volatile object transport container.

12. The volatile object transport container of claim 1, wherein the volatile object is configured to produce a neutron beam when impacted by a beam of energetic protons.

13. The volatile object transport container of claim 1, further comprising a pumping port radially extending from the target container housing.

14. A method of storing a volatile object in a volatile object transport container, the method comprising:

affixing a plurality of clamp assemblies to the volatile object via a plurality of horizontal holes in a perimeter of the volatile object;

affixing the plurality of clamp assemblies to a target container housing of the volatile object transport container via a plurality of vertical holes in a first surface of the target container housing;

placing a sealing member around a perimeter of the target container housing such that the sealing member is free from contact with the volatile object;

placing a viewport assembly of the volatile object transport container onto the sealing member; and sealing the volatile object transport container using mechanical forces such that the volatile object is free from contamination within the volatile object transport container due to an air-tight seal.

15. The method of claim 14, wherein sealing the volatile object transport container using mechanical forces comprises affixing the viewport assembly to the target container housing via a plurality of vertical holes positioned along a perimeter of the viewport assembly.

16. The method of claim 14, wherein at least any surface of the volatile object having thereon a volatile composition is free from contact with any part of the volatile object transport container.

* * * * *